United States Patent
Rauckman et al.

(10) Patent No.: US 11,189,401 B1
(45) Date of Patent: Nov. 30, 2021

(54) COVER FOR AN ELECTRICAL DISTRIBUTION LINE

(71) Applicant: Gato Assets, LLC, Belleville, IL (US)

(72) Inventors: James B. Rauckman, Swansea, IL (US); David W. McGuire, Jerseyville, IL (US)

(73) Assignee: Gato Assets, LLC, Belleville, IL (US)

( * ) Notice: Subject to any disclaimer, the term of this patent is extended or adjusted under 35 U.S.C. 154(b) by 0 days.

(21) Appl. No.: 16/789,245

(22) Filed: Feb. 12, 2020

Related U.S. Application Data

(60) Provisional application No. 62/806,471, filed on Feb. 15, 2019.

(51) Int. Cl.
*H01B 17/56* (2006.01)
*H01R 4/70* (2006.01)
*H01B 17/38* (2006.01)

(52) U.S. Cl.
CPC ............. *H01B 17/56* (2013.01); *H01B 17/38* (2013.01)

(58) Field of Classification Search
CPC ........ H01B 19/00; H01B 17/00; H01B 17/56; H01B 17/005; H01B 17/26; H01B 17/38; H02G 7/00; H02G 1/02; H01R 4/70
USPC ......... 174/152 G, 153 G, 135, 152 R, 138 R, 174/139, 138 F, 137 R, 5 R, 14 BH, 66, 174/40 R; 361/600, 601; 248/49; 52/101
See application file for complete search history.

(56) References Cited

U.S. PATENT DOCUMENTS

| | | | |
|---|---|---|---|
| 881,682 A | 3/1908 | Harrison et al. | |
| 992,738 A | 5/1911 | Marshall | |
| 1,141,674 A | 6/1915 | Withers | |
| 1,180,729 A | 4/1916 | Marshall | |
| 3,328,511 A | 6/1967 | Cagle et al. | |
| 3,835,238 A | 9/1974 | West | |
| 3,900,698 A | 8/1975 | Yotsugi | |
| 4,234,753 A * | 11/1980 | Clutter | H02G 7/00 174/5 R |
| 4,280,013 A | 7/1981 | Clutter | |
| 4,473,268 A | 9/1984 | Watanabe | |
| 4,845,307 A | 7/1989 | Cumming et al. | |
| 5,873,324 A | 2/1999 | Kaddas et al. | |
| 6,005,196 A | 12/1999 | Spillyards | |
| 6,255,597 B1 | 7/2001 | Bowling et al. | |

(Continued)

OTHER PUBLICATIONS

Power Line Sentry LLC, Double Top Tie Insulator Cap and Conductor Cover, 5 pages, accessed Feb. 9, 2018, https://powerlinesentry.com/double-top-tie-insulator-cap-and-conductor-cover/.

(Continued)

*Primary Examiner* — Angel R Estrada
(74) *Attorney, Agent, or Firm* — Stinson LLP

(57) ABSTRACT

An electrical distribution line cover includes a sleeve defining an elongate cavity extending along the length of the sleeve that is sized to receive an electrical distribution line when the sleeve is installed on the electrical distribution line. The sleeve defines an elongate passage extending along the length of the sleeve and configured to permit passage of the electrical distribution line into the elongate cavity. A resilient clip extends around an exterior surface of the sleeve and biases the passage of the sleeve toward a closed position for inhibiting the passage of the distribution line out of the cavity of the sleeve after the sleeve is installed on the distribution line.

27 Claims, 17 Drawing Sheets

(56) References Cited

U.S. PATENT DOCUMENTS

| | | | |
|---|---|---|---|
| 6,730,852 B1 | 5/2004 | Puigcerver et al. | |
| 7,154,036 B2 * | 12/2006 | Lynch | H02G 7/00 |
| | | | 174/5 R |
| 7,297,869 B2 * | 11/2007 | Hiller | H01B 17/00 |
| | | | 174/138 F |
| 7,884,285 B2 | 2/2011 | Spencer | |
| 8,618,412 B2 * | 12/2013 | Lynch | H01B 17/00 |
| | | | 174/5 R |
| 8,901,428 B2 * | 12/2014 | Miller | H02G 7/00 |
| | | | 174/138 F |
| 8,907,222 B2 * | 12/2014 | Stransky | H02G 3/0418 |
| | | | 174/138 F |
| 9,595,210 B1 | 3/2017 | Rauckman et al. | |
| 9,741,476 B2 | 8/2017 | Hiller et al. | |
| 10,003,182 B2 * | 6/2018 | Newman | H01B 17/00 |

OTHER PUBLICATIONS

Suzhou Volson Electronics Technolgy Co., Ltd, Silicone Rubber Overhead Line Cover Wind Power Project, Mar. 21, 2015, 2 pages, <http://www.szvolsun.com/News/Technical-Knowledge/show_17.html>.

* cited by examiner

COVER FOR AN ELECTRICAL DISTRIBUTION LINE

STATEMENT OF RELATED CASES

This application is a continuation in part of U.S. Application Ser. No. 62/806,471, filed Feb. 15, 2019, the entire contents of which are incorporated herein by reference.

FIELD

The present disclosure generally relates to covers, and more particularly to a protective cover for an electrical distribution line.

BACKGROUND

Various types of protective covers for electrical distribution lines are known. For example, covers may be installed over an electrical distribution line where the line is supported by an insulator on an electrical pole. Such covers can prevent animals and/or utility personnel from contacting the electrical distribution line at the cover. Covers of this type suffer from various drawbacks, such as being difficult to place on the insulator and distribution line and not remaining secured in position on the electrical distribution line in windy conditions.

SUMMARY

In one aspect, an electrical distribution line cover comprises a sleeve having opposite first and second end portions and a length extending therebetween. The sleeve defines an elongate cavity extending along the length of the sleeve sized to receive an electrical distribution line when the sleeve is installed on the electrical distribution line. The sleeve defines an elongate passage extending along the length of the sleeve. The passage is configured to permit passage of the electrical distribution line into the elongate cavity when the sleeve is installed on the electrical distribution line. A resilient clip extends around an exterior surface of the sleeve and biases the passage of the sleeve toward a closed position for inhibiting the passage of the distribution line out of the cavity of the sleeve after the sleeve is installed on the distribution line.

In another aspect, an electrical distribution line cover comprises an insulator cap configured for placement on an insulator holding an electrical distribution line. The insulator cap comprises a cup defining a space within the cup to receive at least a portion of the insulator therein. A sleeve portion extends from the insulator cap. The sleeve portion defines an elongate cavity extending along the length of the sleeve portion sized to receive an electrical distribution line when the electrical distribution line cover is installed on the electrical distribution line. The sleeve defines an elongate passage extending along the length of the sleeve. The passage is configured to permit passage of the electrical distribution line into the elongate cavity when the sleeve is installed on the electrical distribution line. The insulator cap has a rib extending lengthwise of the electrical distribution line cover.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
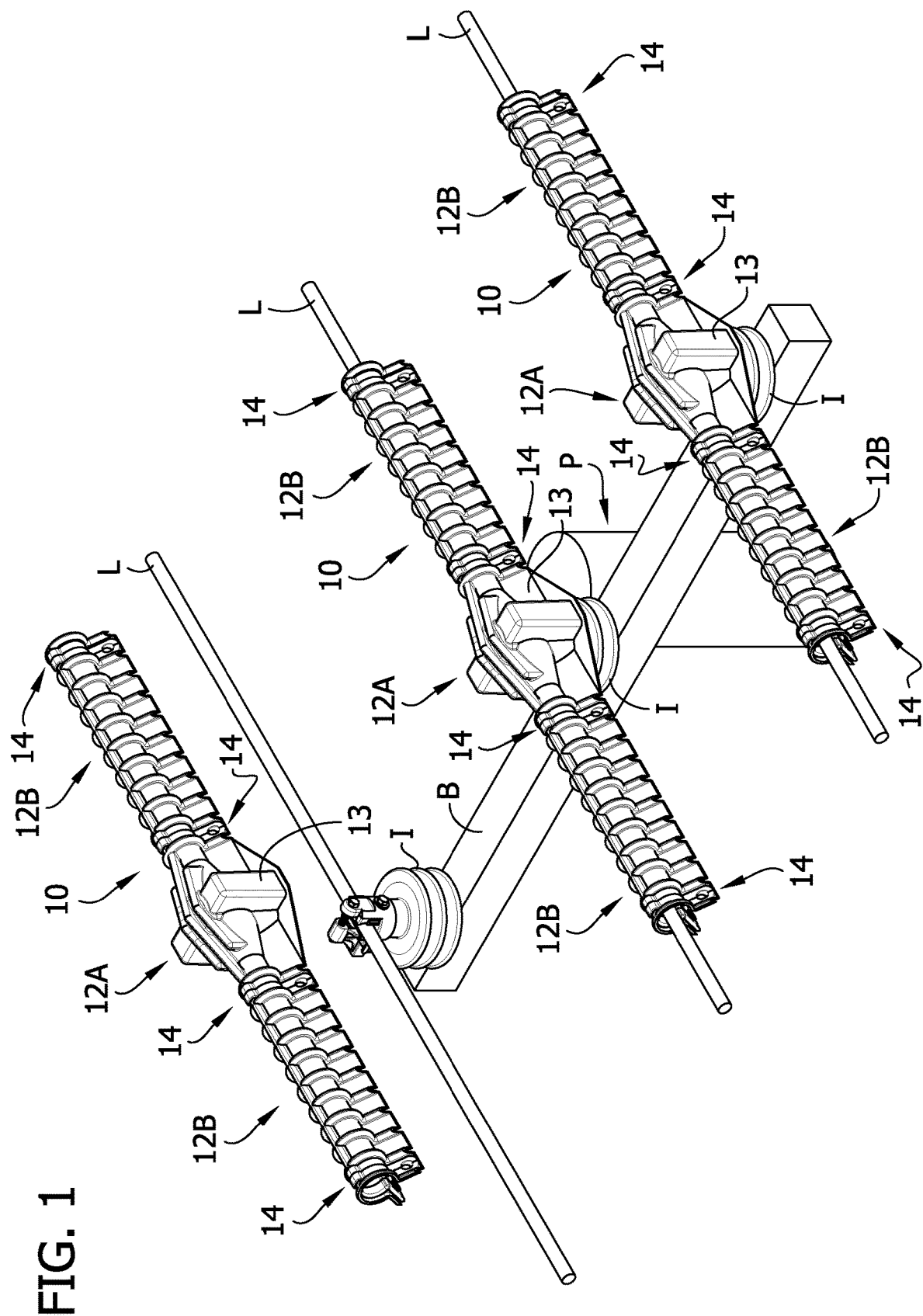
FIG. 1 is a fragmentary perspective of a utility pole supporting three electrical distribution lines with one electrical distribution line cover shown exploded from a first of the electrical distribution lines and additional electrical distribution line covers shown installed on the second and third electrical distribution lines.

Referring to FIG. 1, a utility pole is shown supporting three electrical distribution lines L. The utility pole includes a post P and a cross bar B supporting three insulators I (broadly, "first electrical component). The three electrical distribution lines L (broadly, "second electrical components") are supported on the respective insulators I. The front two electrical distribution lines L have electrical distribution line covers (e.g., electrical distribution line cover assemblies), generally indicated at 10, installed thereon, and the rear electrical distribution line cover is shown removed from the rear electrical distribution line L. In general, the electrical distribution line covers 10 can be used to cover the electrical distribution lines L and the insulators I to prevent injury to animals and/or utility personnel. It will be appreciated that the electrical distribution line covers 10 can be installed on electrical distribution lines in other settings, such as not adjacent a utility pole or insulator supporting the distribution lines. Although the present invention has a particular application for distribution lines and insulators, it may be applied in other situations involving the use of covers and particularly covers of dielectric material.

Figure 17:
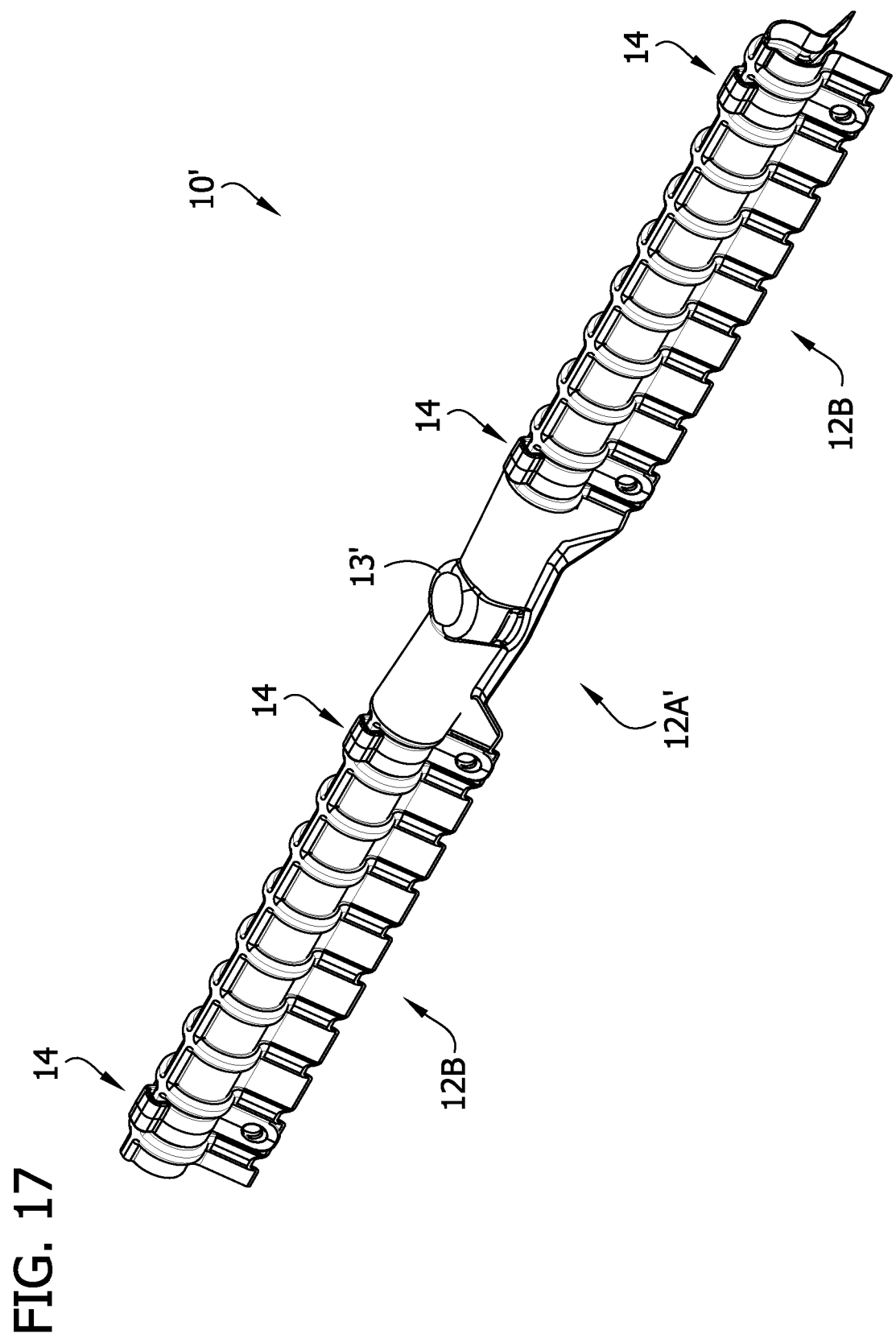
FIG. 17 is a perspective of another embodiment of an electrical distribution line cover according to the present disclosure.

In general, each electrical distribution line cover (e.g., cover) 10 includes an insulator cover 12A (e.g., an insulator cap) and left and right sleeves 12B. The insulator cover 12A is configured for placement on the insulator I holding the electrical distribution line L. The insulator cover 12A comprises a cup 13 defining a space within the cup to receive at least a portion of the insulator I therein. As shown in FIG. 1, when the cover 10 is installed on the electrical distribution line L, the cup 13 covers and overlies the portion of the insulator I connected to the electrical distribution line (e.g., an upper portion of the insulator). Each sleeve 12B has a first end portion connected to the insulator cover 12A and a second end portion (e.g., free end) spaced from the insulator cover. The insulator cover 12B and left and right sleeves 12B can be formed of molded plastic or another suitable electrically insulating and/or fire retardant material, such as rubber. The sleeves 12B can be formed integrally with the insulator cover 12A or can be formed separately and then secured to the insulator cover. The number of sleeves 12B extending from the insulator cover 12A could be other than two. Moreover, a sleeve 12B could be used without an insulator cover 12A. The left sleeve 12B extends to the left (e.g., first direction) from the insulator cover 12A to cover a left segment of the distribution line L, and right sleeve 12B extends to the right (e.g., second direction) from the insulator cover to cover a right segment of the distribution line (the left and right segments of the distribution line extending from the insulator I). The insulator cover 12A and cup 13 are sized and shaped to correspond to the size and shape of the insulator I. Accordingly, electrical distribution line covers 10 with insulator covers 12A of other sizes and shapes that correspond to other sizes and shapes of insulators are within the scope of the present disclosure. An example of such an electrical distribution line cover is generally indicated at 10' in FIG. 17. In this embodiment, the electrical distribution line cover 10' includes an insulator cover 12A' with a cup 13' for an insulator (not shown) of a different configuration than insulator I.

Figure 2:
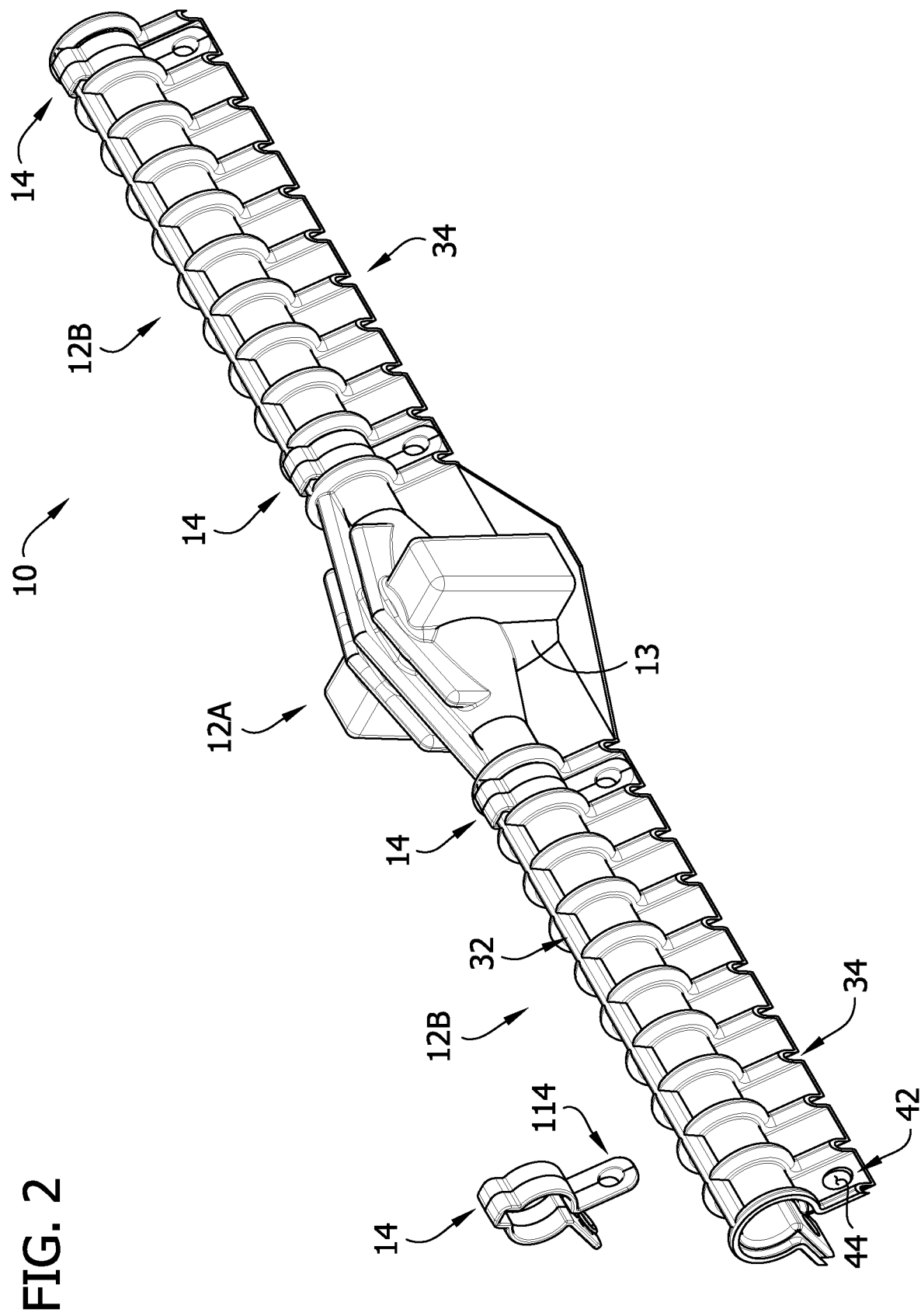
FIG. 2 is a perspective of the electrical distribution line cover showing a first clip exploded from the cover and second, third and fourth clips installed on the cover.
Figure 3:
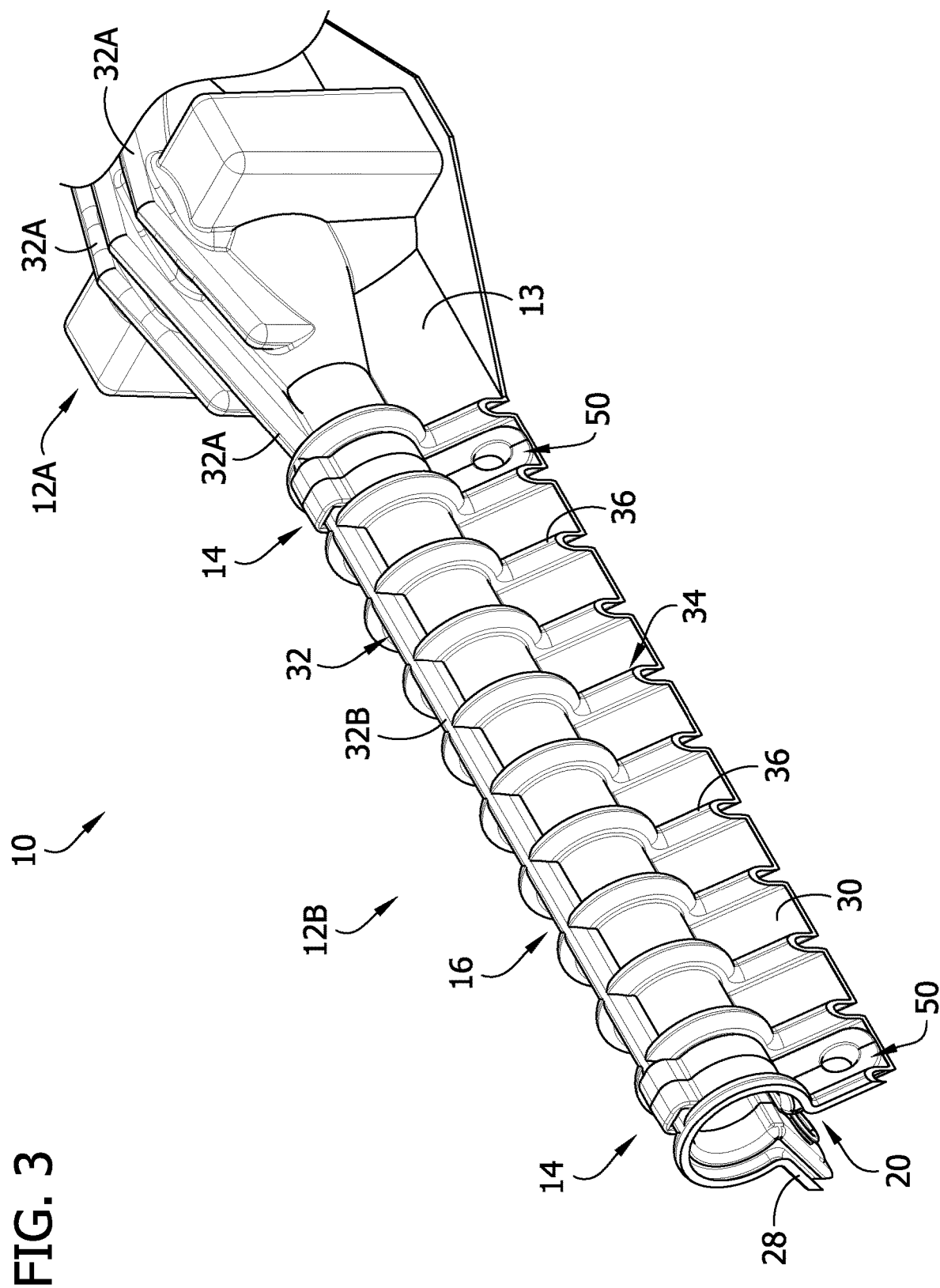
FIG. 3 is an enlarged fragmentary view of the left side of the electrical distribution line cover of FIG. 2 with the first and second clips installed on the cover.
Figure 4:
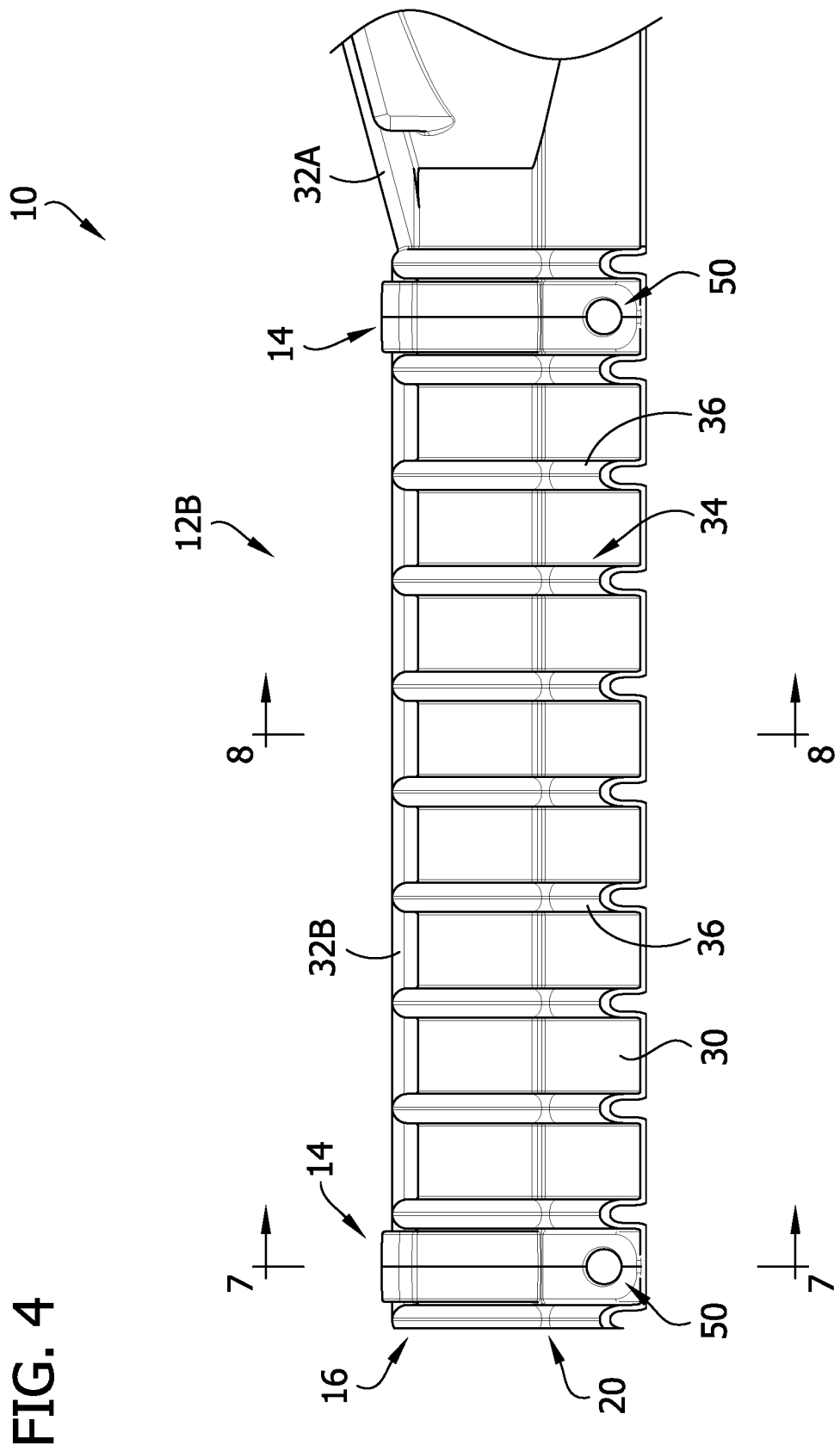
FIG. 4 is a fragmentary side elevation thereof.
Figure 5:
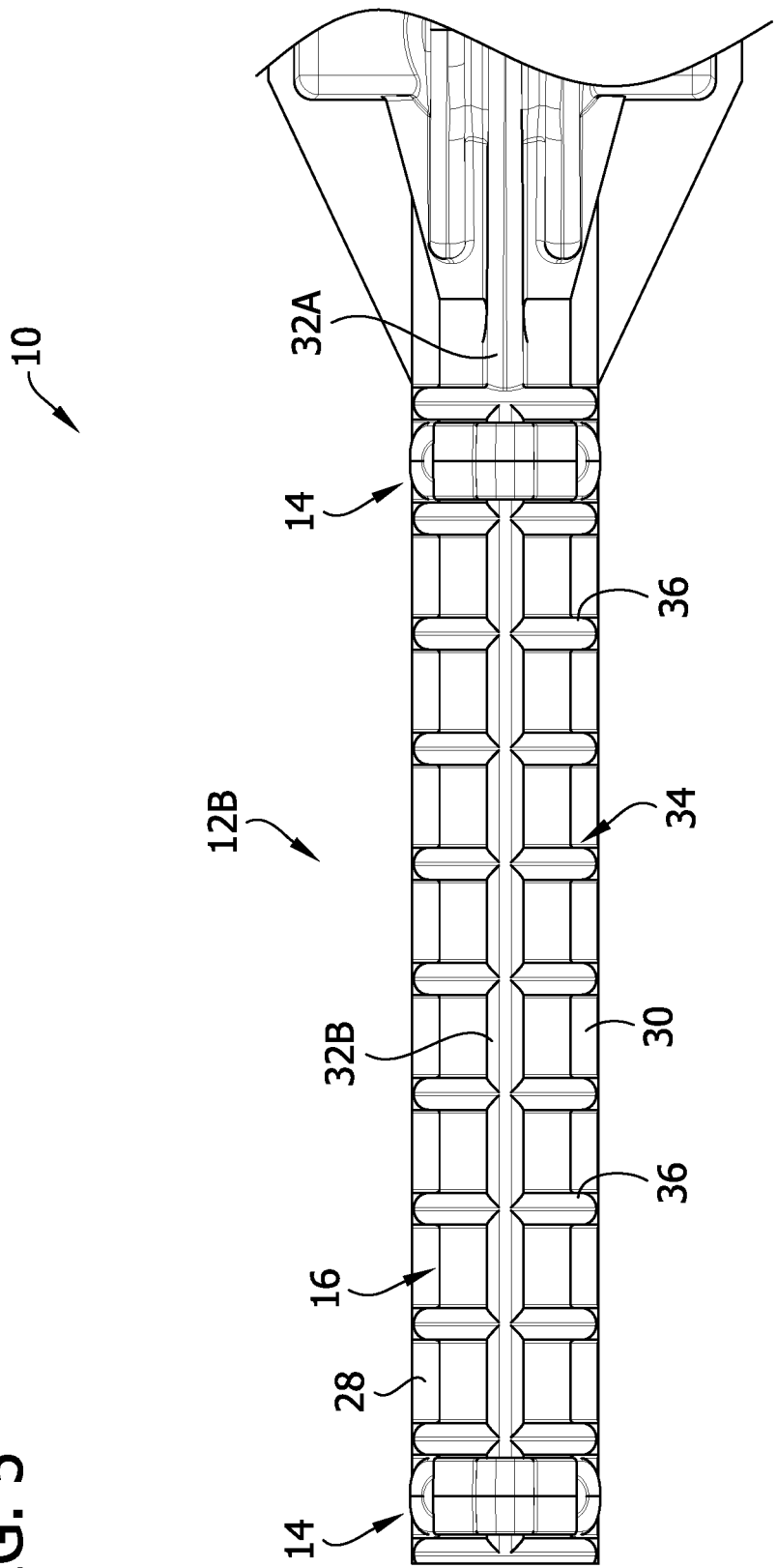
FIG. 5 is a fragmentary top view thereof.
Figure 6:
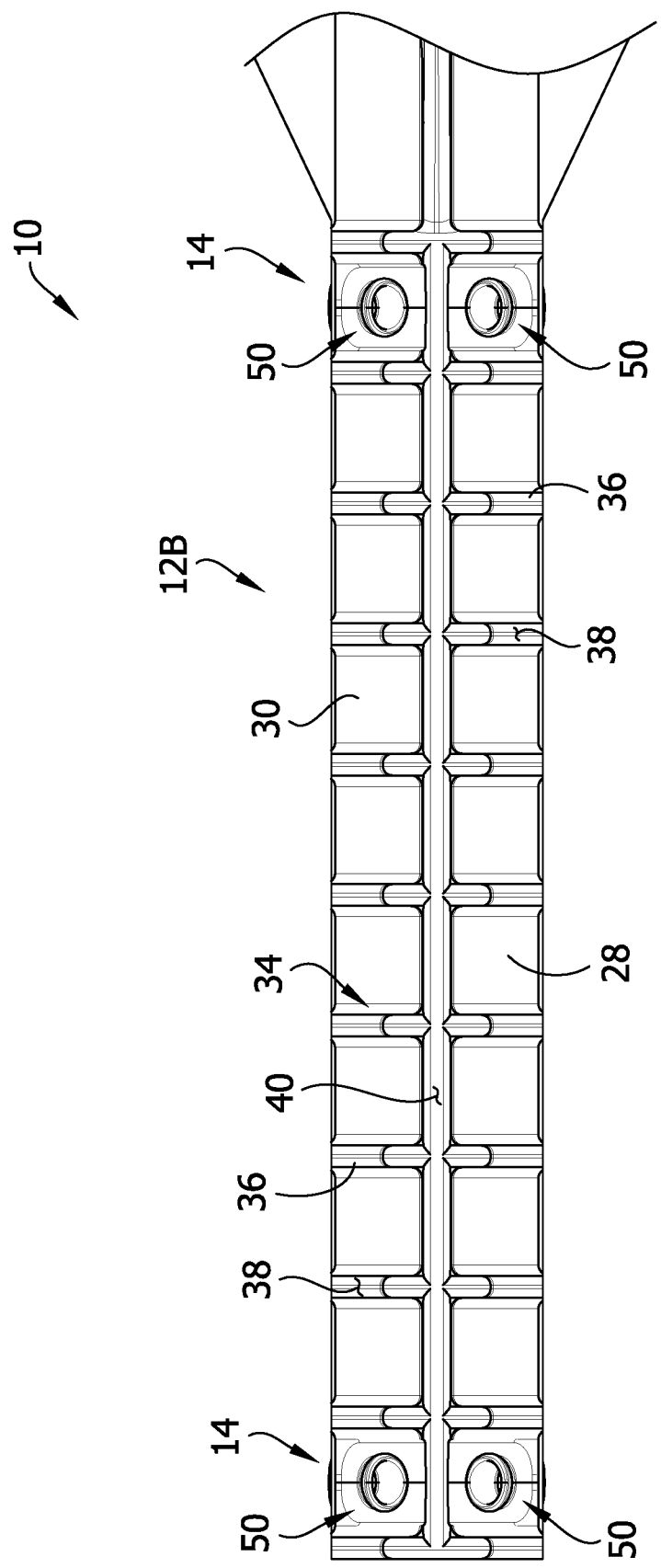
FIG. 6 is a fragmentary bottom view thereof.

The cover 10 includes clips 14 (broadly, at least one clip) installed over the sleeves 12B to assist in maintaining the insulator cover 12A on the insulator I and left and right sleeves 12B on the electrical distribution line L. For example, as shown in FIG. 2, two clips 14 can be used on each sleeve 12B to maintain the sleeve on the electrical distribution line L. As will become apparent, the clips 14 have shapes corresponding to the exterior surface of the sleeve 12B such that the clips closely conformally engage the sleeve. The clips 14 can be formed of molded plastic or another suitable material. It will be appreciated that more or fewer clips 14 (e.g., none) can be used without departing from the scope of the present disclosure.

Referring to FIGS. 3-8, the left sleeve 12B will be described in further detail with the understanding the right sleeve 12B has essentially the same construction (e.g., the right sleeve is a mirror image of the left sleeve). The sleeve 12B includes an upper electrical distribution line receptacle 16 (e.g., upper portion) having a generally tubular shape. The receptacle 16 defines an elongate cavity 18 (FIGS. 7 and 8) sized for receiving and housing the electrical distribution line L. The elongate cavity 18 extends along the length of the sleeve 12B between opposite first and second end portions of the sleeve. The first end portion of the sleeve 12B is attached to the insulator cover 12A and the second end portion (e.g., free end portion) is spaced therefrom.

The sleeve 12B includes a waist portion 20 below the receptacle 16. The waist portion 20 is connected to the receptacle 16 and extends therefrom. The waist portion 20 defines an elongate passage 22 (FIGS. 7 and 8) extending along the length of the sleeve 12B. The electrical distribution line L can be received in the elongate cavity 18 through the elongate passage 22. The passage 22 is configured to permit passage of the electrical distribution line L into the elongate cavity 18 when the sleeve 12B is installed on the electrical distribution line. The waist portion 20 of the sleeve 12B includes a front wall 24 and a rear wall 26 defining the elongate passage 22. The walls 24, 26 extend along the length of the sleeve 12B and oppose each other on opposite front and rear sides of the passage 22. The walls 24, 26 extend downward from the receptacle 16. The sleeve 12B includes two legs 28, 30 projecting from the waist portion 20 on opposite sides of the sleeve. The legs 28, 30 project to positions below and laterally outward from the waist portion 20. In other words, each leg 28, 30 has a first end connect to one of the walls 24, 26 and a second end (e.g., a free end) spaced apart below and laterally outward from the first end. The legs 28, 30 diverge from each other as they project (e.g., extend) away from the waist portion 20 to facilitate reception of the sleeve 12B onto the distribution line L. The passage 22 has a width (FIGS. 7 and 8) that is smaller than a width of the cavity 18 and, preferably, smaller than the diameter of the electrical distribution line L received in the cavity to assist in maintaining the sleeve 16B on the electrical distribution line. In other words, the waist portion 20 has a smaller width than a width of the receptacle 16 and smaller than a separation of (e.g., a distance between) the legs 28, 30. In addition, the separation of the legs 28, 30 at the free ends thereof is greater than the width of the receptacle 16. Such a configuration results in the legs 28, 30 form an inverted V cross-sectional shape that funnels and guides the electrical distribution line L to the passage 22 of the sleeve 12B when the cover 10 is installed on the electrical distribution line.

Figure 9:
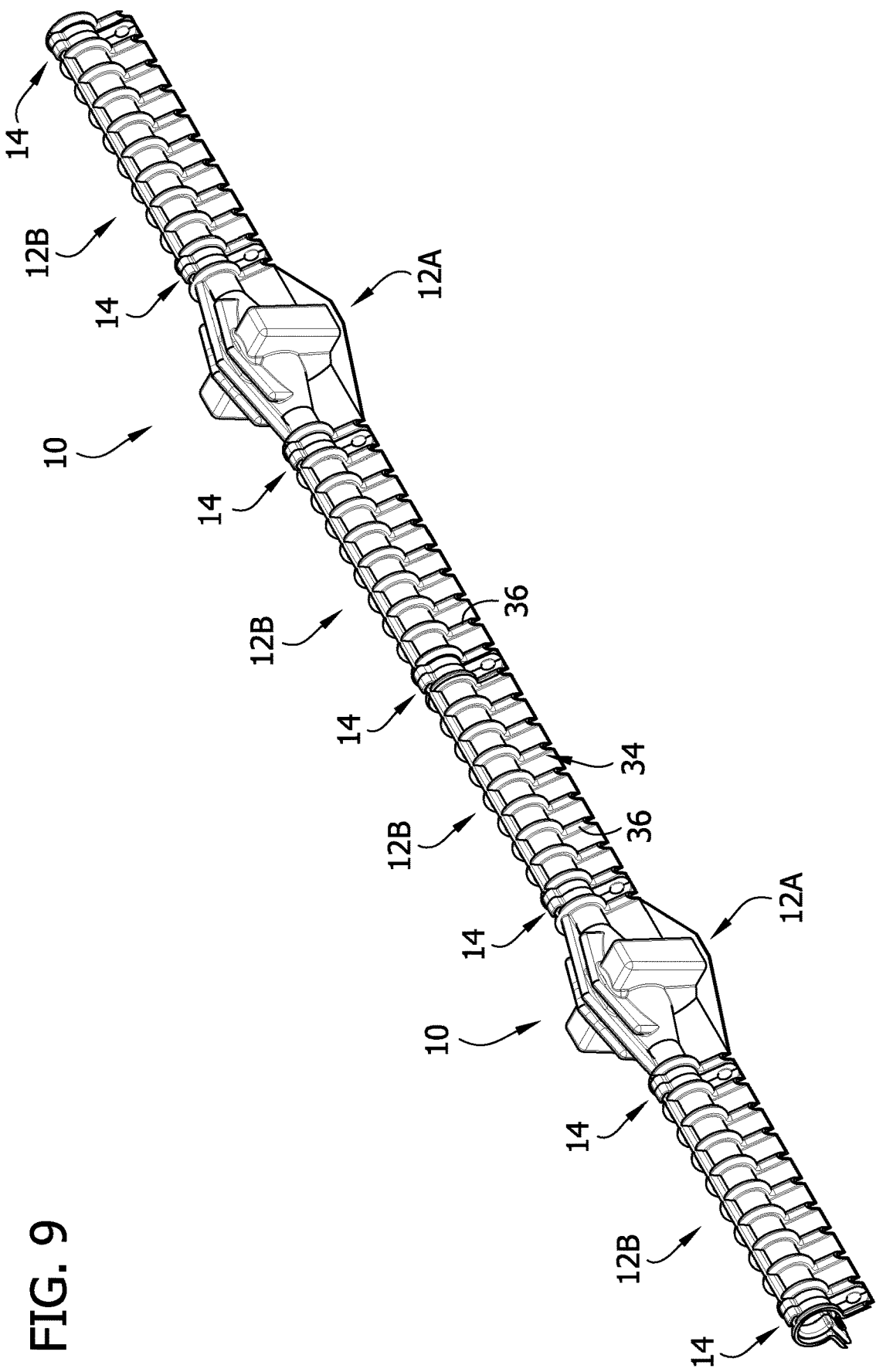
FIG. 9 is a perspective of first and second electrical distribution line covers attached together.

The sleeve 12B includes (e.g., is formed with) interlocking formations 34 constructed and arranged to mate with interlocking formations of another sleeve of another cover (FIG. 9). As explained in more detail below, the interlocking formations 34 facilitate the positioned of two covers 10 relative to one another. In the illustrated embodiment, the interlocking formations 34 include a plurality of raised tabs or projections 36 extending widthwise of the sleeve 12B. The tabs 36 are in spaced apart relation with each other in the lengthwise direction of the cover 10. In the illustrated embodiment, the sleeve 12B includes 11 tabs 36, although more or fewer tabs are within the scope of the present disclosure. Each tab 36 extends outward (e.g., radially and/or laterally outward) from the receptacle 16, the waist portion 20 and the legs 28, 30. Each tab 36 extends over the exterior surface of the sleeve 12B. Each tab 36 defines a roughly omega-shaped channel 38 (FIG. 6) configured to receive a tab of another cover 10. The channel 38 extends widthwise of the sleeve 12B over the interior surface of the sleeve and has an open bottom. The channel 38 is in communication with the cavity 18 and passage 22. Thus, as explained in more detail below, when the sleeve 12B of the cover 10 is placed over (e.g., overlies) the sleeve of another cover, the tabs 36 of the sleeve of the cover are received in the respective channels 38 of the overlying cover. Each tab 36 has a roughly omega cross-sectional shape. The tabs 36 also help strengthen and stiffen the sleeve 12B and, thus, may be considered as laterally extending ribs.

Figure 7:
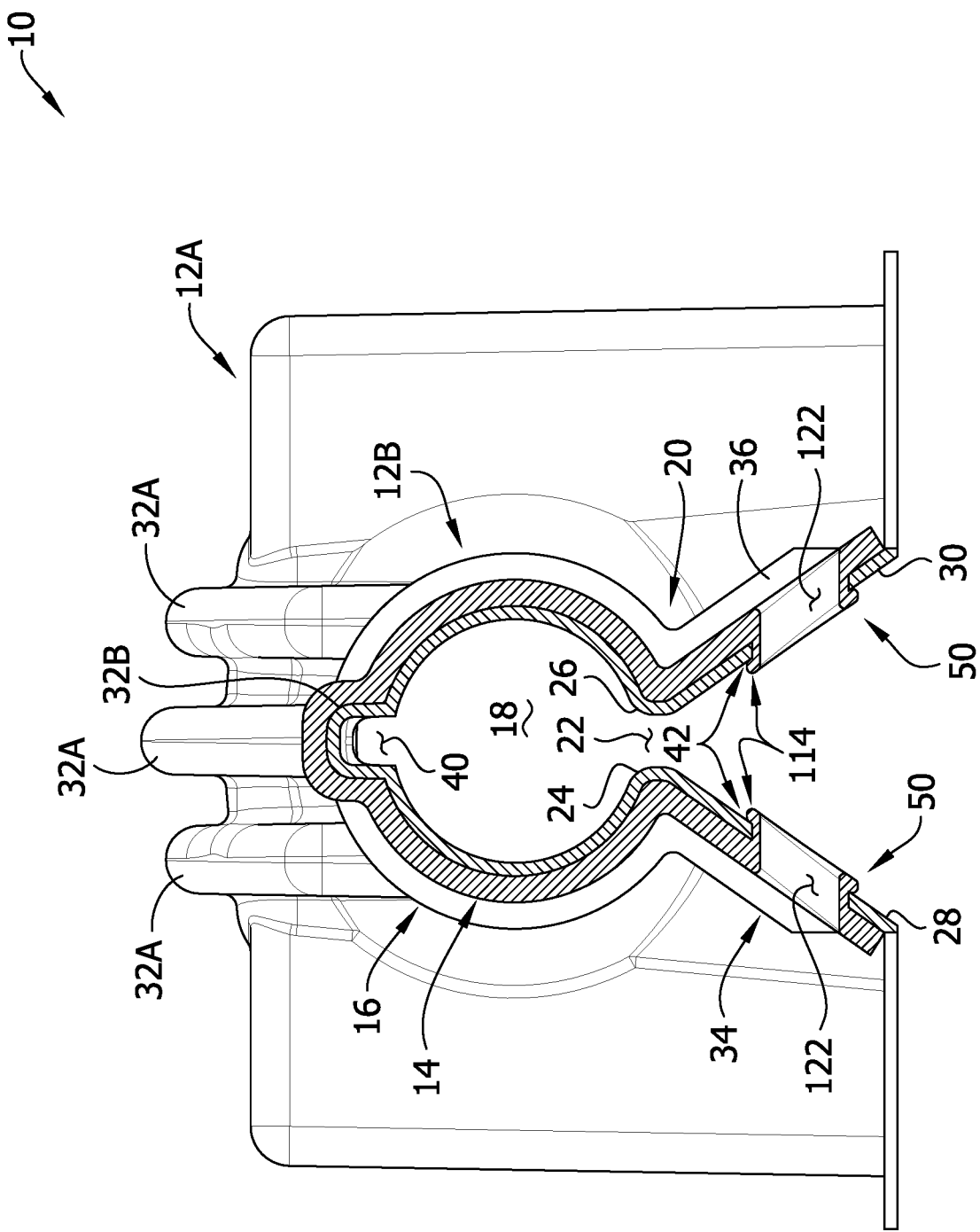
FIG. 7 is a cross section of the electrical distribution line cover taken through line 7-7 in FIG. 4.
Figure 8:
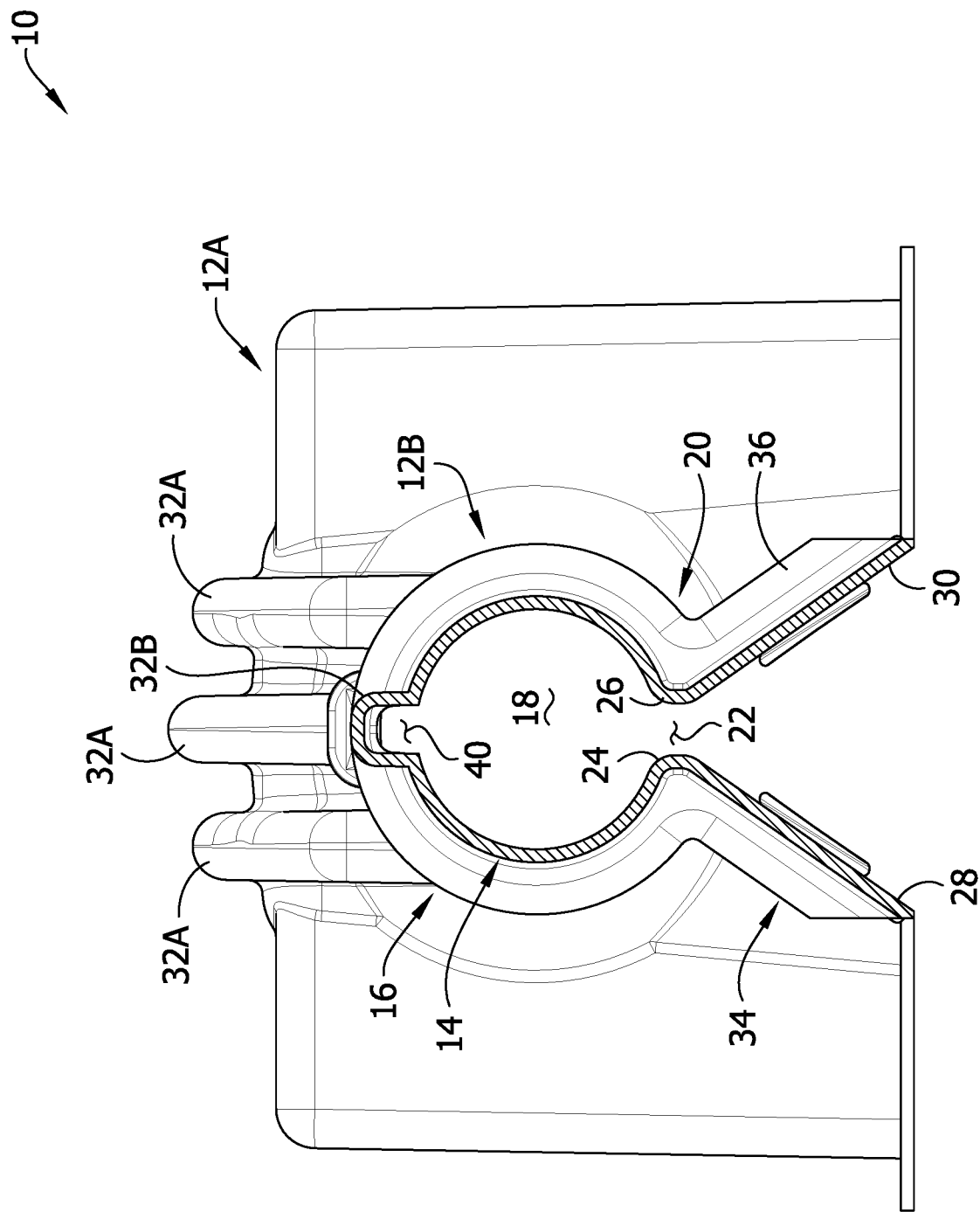
FIG. 8 is a cross section of the electrical distribution line cover taken through line 8-8 in FIG. 4.

Still referring to FIGS. 3-8, the cover 10 includes a rib 32 (e.g., an elongate rib) extending lengthwise of the cover. Preferably, the cover 10 includes at least one rib 32 extending over the entire length of the cover. The rib 32 is disposed on (e.g., connected to) the upper end of the insulator cover 12A and left and right sleeves 12B to stiffen the cover 10 and to prevent the portions of the cover (e.g., the sleeves) from drooping downward from the point where they are held by a hot stick (not shown). The rib 32 has a generally inverted channel shape (FIGS. 7 and 8). In the illustrated embodiment, the rib 32 includes an insulator cover rib portion 32A (broadly, a rib) and left and right sleeve rib portions 32B (each, broadly, a rib). The insulator cover 12A may include more than one rib. For example, the insulator cover 12A can include a plurality of ribs 32A spaced apart from each other widthwise of the cover 10. In the illustrated embodiment, the insulator cover 12A includes three ribs 32A. Each of the ribs 32A are generally parallel with one another and extend lengthwise of the cover 10. At least one rib 32A extends along the length of the insulator cover 12A with the other ribs preferably extending over at least a majority of the length of the insulator cover.

Referring to the left sleeve 12B, with the understanding the teachings described herein apply equally to the right sleeve, the rib 32B extends upward from the receptacle 16. The rib 32B extends along the length of the sleeve 12B between opposite first and second end portions of the sleeve. The rib 32B extends from and is continuous with a center one of the ribs 32A of the insulator cover 12A, thereby forming a single rib 32 extending the length of the cover. In other words, the rib 32B of the sleeve 12B is aligned with one of the ribs 32A of the insulator cover 12A. For reasons that will become apparent, the rib 32B on the sleeve 12B is generally opposite the passage 22 of the sleeve. Other configurations are within the scope of the present disclosure. For example, the sleeve 12B can have more than one rib 32B.

In the illustrated embodiment, the rib 32B of sleeve 12B are also part of the interlocking formations 34. The rib 32B defines a channel 40 (FIGS. 7 and 8) configured to receive a rib of a sleeve of another cover 10. The channel 40 extends lengthwise of the sleeve 12B over the interior surface of the sleeve. The channel 40 is in communication with the cavity 18 and passage 22. Each tab 36 and rib 32B intersect one another. Thus, the channels 38 and 40 are in communication with one another. As explained in more detail below, when the sleeve 12B of the cover 10 is placed over (e.g., overlies) the sleeve of another cover, the rib 32B of the sleeve of the other cover is received in the channels 40 of the overlying cover.

Figure 10:
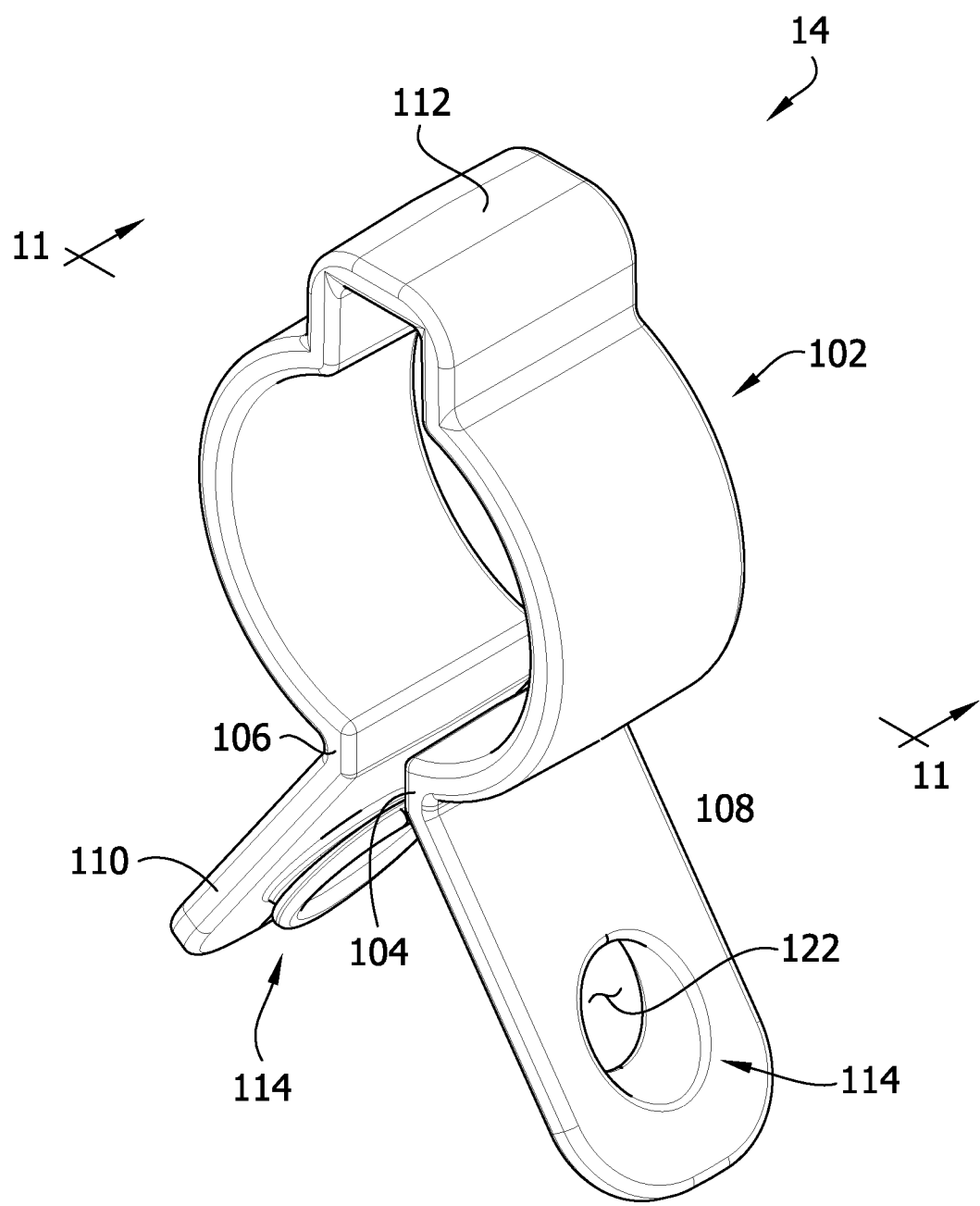
FIG. 10 is a perspective of the clip.
Figure 11:
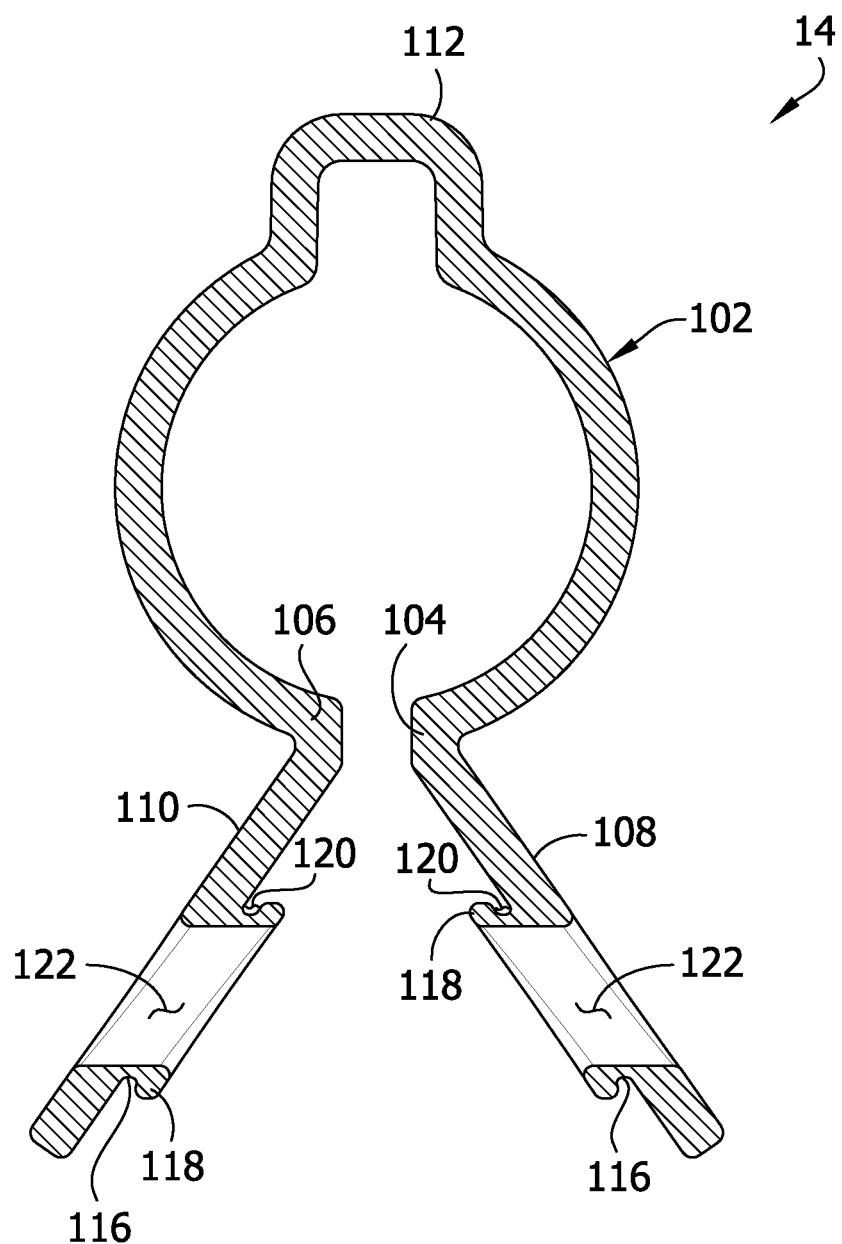
FIG. 11 is a cross section of the clip taken through line 11-11 in FIG. 10

Referring to FIGS. 10 and 11, one of the clips 14 will be described in further detail with the understanding that the other clips shown in the drawings have the same construction. The clip 14 is configured to bias the passage 22 of the sleeve 12B toward a closed position for inhibiting passage of the electrical distribution line L out of the cavity 18 of the sleeve after the sleeve is installed on the electrical distribution line. In general, the clip (e.g., resilient clip) 14 has an upper generally arcuate collar 102, front and rear flanges 104, 106 (together defining a throat of the clip) extending downward below the collar and front and rear legs 108, 110 extending downward below and laterally outward from the front and rear flanges. The collar 102 includes a rib 112 extending upward from an upper end of the collar. The clip 14 has a cross sectional shape corresponding to the cross sectional shape of the sleeve 12B (FIG. 7). Specifically, the clip 14 has an interior surface that corresponds to the exterior surface of the sleeve 12B. As shown in FIGS. 7 and 11, the collar 102 bounds a space sized for reception of the receptacle 16, the rib 112 bounds a space sized for reception of the rib 32B of the sleeve 12B, the front and rear flanges 104, 106 bound a space sized for reception of the waist portion 20 and the front and rear legs 108, 110 bound a space sized for reception of the legs 28, 30. Thus, the clip 14 substantially surrounds the sleeve 12B, and therefore the electrical distribution line L, when the clip is installed (e.g., connected to) to the sleeve. Specifically, the clip 14 extends around the exterior surface of the sleeve 12B. Preferably, the clip 14 extends around most of the exterior surface in a widthwise direction of the sleeve 12B. In the illustrated embodiment, when the clip 14 is attached to the sleeve 12b, the clip extends from and over the free end of the rear leg 28, the waist portion 20, the receptacle 16, and the rib 32B to the free end of the front leg 30. The collar 102 is resiliently deformable to permit the flanges 104, 106 and legs 108, 118 to be spread for installation of the clip 14 onto the sleeve 12B. The front and rear legs 108, 110 diverge from each other as they extend downward, similar to legs 28, 30, to facilitate installation of the clip 14 on the sleeve 12B and reception of the distribution line L into the receptacle cavity 18. It is appreciated that the construction of the clip 14 provides the clip with a cross sectional shape closely resembling the shape of the sleeve 12B and, specifically, the exterior surface of the sleeve 12B.

When the clip 14 is connected to the sleeve 12B, the front and rear flanges 106, 108 engage the walls 24, 26, respectively, of the waist portion 20. In other words, the walls 24, 26 of the waist portion 20 extend through the throat of the clip 14. Preferably, when the clip 14 is at a rest state, the front and rear flanges 104, 106 engage one another or are spaced apart by a distance less than the width of the passage 22 (when the sleeve 12B is at a rest state as well) so that when the clip is applied to the sleeve 12B, the flanges 104, 106 engage the waist portion 20 and, preferably, generally close the passage (e.g., push the walls 24, 26 toward another and, preferably, into engagement with one another). The clip 14 resists the spreading of the walls 24, 26 of the sleeve 12B away from one another to keep the passage 22 closed (e.g., the clip prevents opening or enlarging the width of the passage by a sufficient distance that would enable the electrical distribution line L to pass through the passage). In this manner, the clip 14 biases the passage 22 toward the closed position to inhibit the removal of the electrical distribution line L out of the cavity 18 of the sleeve 12B. It is appreciated that such a construction assists in blocking the electrical distribution line L from inadvertently moving out of the elongate cavity 18 through the passage 22. For example, wind tending to force the sleeve 12B upwardly forces the electrical distribution line L in the conductor against upward facing surfaces of the receptacle 16 (adjacent the walls 24, 26), which resist the upward movement of the cover assembly. When the clip 14 is attached to the sleeve 12B, the clip is disposed between adjacent tabs 36. In other words, the adjacent tabs 36 define a space therebetween that can receive the clip 14.

In the illustrated embodiment, each clip 14 is attached to the sleeve 12B with a connection, generally indicated at 50 (FIG. 7). Broadly, each clip 14 is attached to the sleeve 12B with at least one connection 50. More specifically, each clip 14 is attached to the sleeve 12B with two connections 50 and, desirably, the connections are releasable. Desirably, the connection is strong enough to hold the clip 14 on the sleeve 12B during transport and manipulation of the clover. However, the connection 50 can be broken without excessive effort when it is desired to remove the clip 14. Each connection 50 includes a joining portion 42 of the sleeve 12B and a mounting portion 114 of the clip 14. The joining portion 42 of the sleeve 12B includes an opening 44 in the sleeve (FIG. 2). Preferably, the opening 44 is (e.g., defined by) one of the legs 28, 30 of the sleeve 12B. The opening 44 is disposed between adjacent tabs 36. The sleeve 12B includes openings 44 adjacent only the first and second ends, although more or fewer openings and/or openings at other positions along the sleeve are within the scope of the present disclosure. The mounting portion 114 of the clip 14 extends through the opening 44. In the illustrated embodiment, each mounting portion 114 is positioned on one of the legs 108, 110 in order to align with the joining portion 42 when the clip 14 is attached to the sleeve 12B. The mounting portion 114 includes a generally cylindrical wall 116 extending from one leg 28, 30 generally toward the other leg. The wall 116 includes a lip 118 extending radially outward from the cylindrical wall at the free end thereof. Together, the leg 28, 30, cylindrical wall 116 and lip 118 define a circumferential recess or channel 120 extending around the mounting portion 114. When the clip 14 is secured to the sleeve 12B, the edge of the leg 28, 30 defining the opening 44 extends into the recess 120 of the mounting portion 114 to secure the clip to the sleeve (FIG. 7). Thus, the joining portion 42 of the sleeve 12B surrounds the mounting portion 114 of the clip 14. Other means of connecting the clip 14 to the cover 10 may be used, or the connection may be omitted. For example, the connection 50 may be formed by molding the material of the sleeve 12B around a portion (e.g., mounting portion 114) of the clip 14. Each connection 50 is releasable. The joining portion 42 of the sleeve 12B is deformable to release the connection 50 attaching the clip 14 to the sleeve. The legs 28, 30 are resiliently deformable to enable the openings 44 to be enlarged and allow the mounting portions 114 of the clips 14 to be inserted therein or removed therefrom. In still other non-limiting embodiments, the mounting portions 114 may be omitted. Still further, the clips (not shown) may be molded over the sleeve 12B.

Referring to FIGS. 7, 10 and 11, the mounting portions 114 of the clip 14 each define an opening 122 (e.g., oblong opening) for reception of a hook of a hotstick to facilitate installation of the cover 10 on the electrical distribution line L. When the clip 14 is attached to the sleeve 12B, the opening 122 of the mounting portion 114 and the opening 44 in one of the legs 28, 30 are in register with each other to facilitate the gripping of the sleeve 12b by the hook of the hotstick or other tool. In other words, the openings 44, 122 in the sleeve 12B and the clip 14 are arranged to jointly receive the hook of the hotstick for grasping the cover 10 to manipulate the cover for application to the electrical distribution line L and removal from the electrical distribution line. To attach the cover 10 to the electrical distribution line L, the hook of a hotstick is inserted through the openings 44, 122, the cover is positioned over the electrical distribution line, usually from a position below the distribution line. The rib 32 helps to keep the free ends of the cover 10 from bending down excessively so it is easier to position the cover over the electrical distribution line L and insulator I. The lineman then pulls down on the hotstick, pulling the cover downward. As the cover 10 is pulled downward, the electrical distribution line L spreads the walls 24, 26 apart (resiliently deflecting the clips 14), thereby widening the passage 22, to pass the distribution line through the passage and move into the cavity 18. Once the electrical distribution line L is in the cavity 18, the clip 14 returns to its rest state, closing the passage 22 to prevent inadvertent withdrawal.

Referring to FIG. 9, in one method of use, adjacent covers 10 are shown connected together in an overlapping arrangement. Such an arrangement may be used to cover an electrical transmission line L supported by insulators I on poles located close together (not shown). The sleeves 12B are constructed to overlap with each other to connect the covers 10 together. In this arrangement, a portion of one sleeve 12B of one cover 10 overlies a portion of one sleeve of the other cover to form an overlap section. In particular, the portion of one sleeve 12B of one cover 10 extends around the exterior surface of the portion of one sleeve of the other cover. In other words, the sleeve 12B of one cover 10 is inserted into and received by the sleeve of the other cover. In this manner, the receptacle 16 of the underlying sleeve 12B is received in the cavity 18 of the overlying sleeve, the waist portion 20 of the underlying sleeve is received in the passage 22 of the overlying sleeve and the legs 28, 30 of the underlying sleeve are disposed between the legs of the overlying sleeve. As mentioned above, the interlocking formations 34 (e.g., tabs 36 and/or rib 32) facilitate the positioning and interconnection of the two covers 10 (specifically, sleeves 12B) to one another. When the underlying sleeve 12B of one cover 10 is inserted into the overlying sleeve of another cover, the one or more tabs 36 of the underlying sleeve extend into the one or more channels 38 defined by the tabs of the overlying sleeve. Similarly, the rib 32B of the underlying sleeve 12B extends into the channel 40 defined by the rib of the overlying sleeve. The engagement between the tabs 36 of the underlying and overlapping sleeves 12B positions the covers 10 longitudinally relative to one another, and at least lightly holds the sleeves together.

To more securely connect the overlapping portions of the sleeves 12B, a clip 14 may be applied. In one example, one of the covers 10 would have one of its sleeves 12B cut to a shorter length. The removed remnant of the sleeve 12B can have its clip 14 removed. The clip 14 remaining attached to the cover 10 can be removed in a similar fashion. Preferably, the connection of the clips 14 to the sleeve 12B is such that the clips can each be simply pulled off by hand. In the illustrated embodiment, one of the clips 14 removed from the shortened sleeve 12B is applied to the full length sleeve before being placed onto the distribution line L. In this embodiment, the mounting portion 114 of the clip 14 may extend through the overlapping portions of the sleeves 12B. In other embodiments, the clip 14 may be held only by the grip of the clip onto the sleeve 12B. The cut sleeve 12B and the full sleeve of the other cover 10 can be overlapped as described above. The clip 14 of the full sleeve 12B at its free end can be used to clip the full sleeve onto the cut sleeve in the overlap section for secure connection. The clip 14 removed from the cut sleeve 12B and applied to the full length sleeve is applied over another part of the overlapping portions of the sleeves to achieve a uniform, strong interconnection of the overlapping sleeves. It will be understood that the clips 14 retain their functionality for holding the cover 10 onto the distribution line L. Other arrangements for overlapping and securing sleeves of two adjacent covers 10 together may be used within the scope of the present invention.

Figure 12:
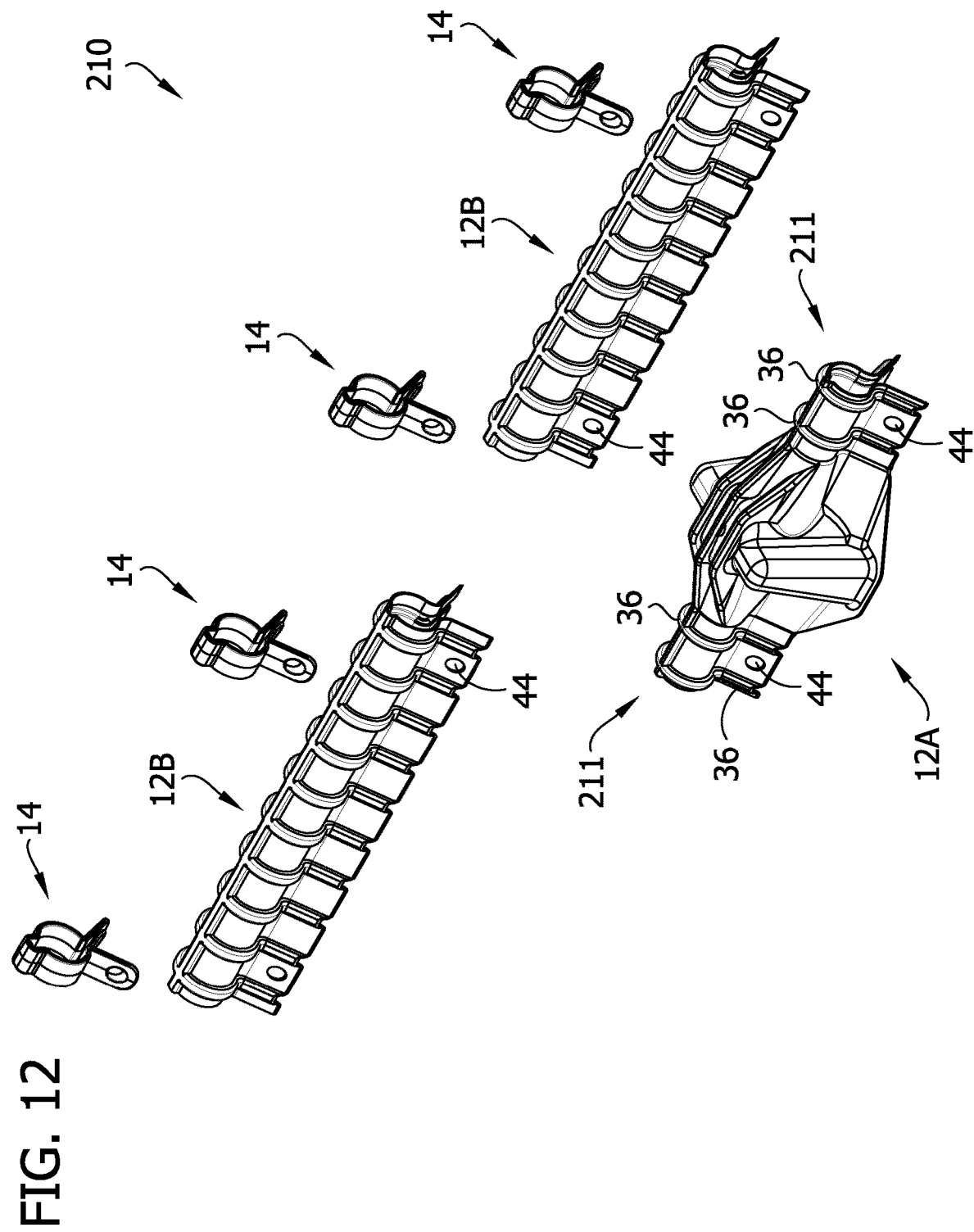
FIG. 12 is an exploded perspective of another embodiment of an electrical distribution line cover according to the present disclosure.

Referring to FIGS. 12-16, another embodiment of the electrical distribution line cover is generally indicated at 210. Electrical distribution line cover 210 is generally the same as electrical distribution line cover 10 except that that insulator cover 12A and sleeves 12B are formed separately and then attached together. Thus, the distribution line cover 210 can be supplied as a kit, and/or the insulator cover 12A and sleeves 12B can be provided separately from each other for assembly in the field as required for a particular situation. In this embodiment, the insulator cover 12A includes sleeve mounting portions 211 to mount each sleeve 12B to the insulator cover. Generally, each sleeve mounting portion 211 is sized and shaped as a segment of the sleeve 12B. In other words, each sleeve mounting portion 211 is generally a shorter version of the sleeve 12B and therefore generally includes a receptacle, a waist portion, legs, a rib, tabs and/or openings. To attach the sleeves 12B to the insulator cover 12, the first end portion of each sleeve 12B are arranged to overlap one of the sleeve mounting portions 211 such that the sleeve overlies the sleeve mounting portion. This is similar to the overlapping of adjacent covers 10 described above in relation to FIG. 9, and thus a detailed description of the overlapping of sleeve 12B and the sleeve mounting portion 211 is omitted herein. Each sleeve 12B may be secured to the insulator cover 12A (specifically, the sleeve mounting portion) by sonic welding, adhesive, or any other suitable means. In one embodiment, a clip 14 is used to secure the sleeve 12B to the insulator cover 12B. For example, the mounting portion 114 of each clip 14 may extend through aligned openings 44 in the sleeve 12B and sleeve mounting portion 211 to secure the two components together. However, it will be understood that the mounting portion 114 need not extend through the sleeve 12B or cover 12A in order to secure the two together or hold the assembled distribution line cover 10 on the distribution line L. When the electrical distribution line cover 210 of FIG. 12 is assembled, the electrical distribution line cover 210 looks generally the same as electrical distribution line cover 10 shown in FIG. 2.

Figure 13:
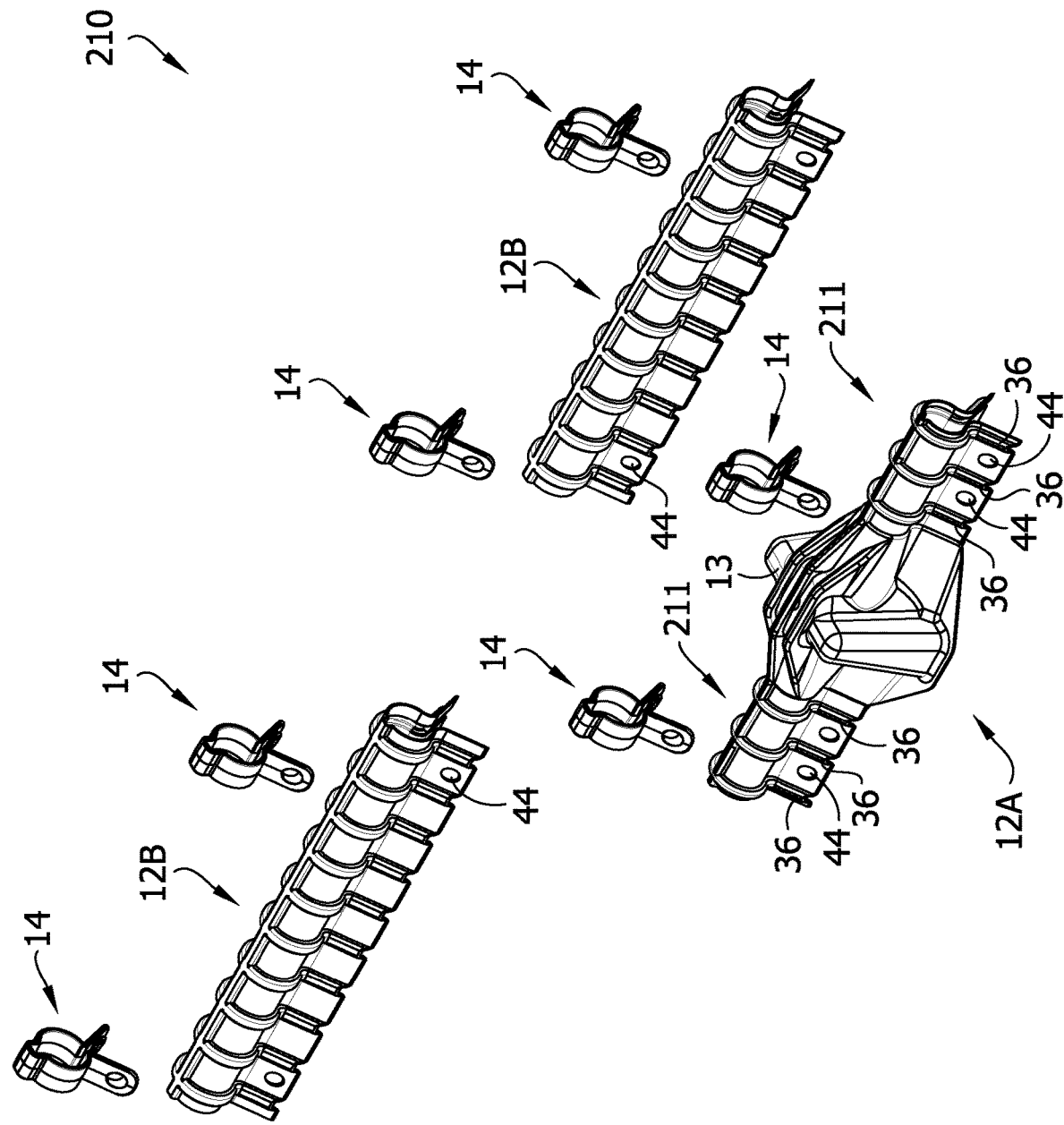
FIG. 13 is an exploded perspective of another version of an electrical distribution line cover of FIG. 12.
Figure 14:
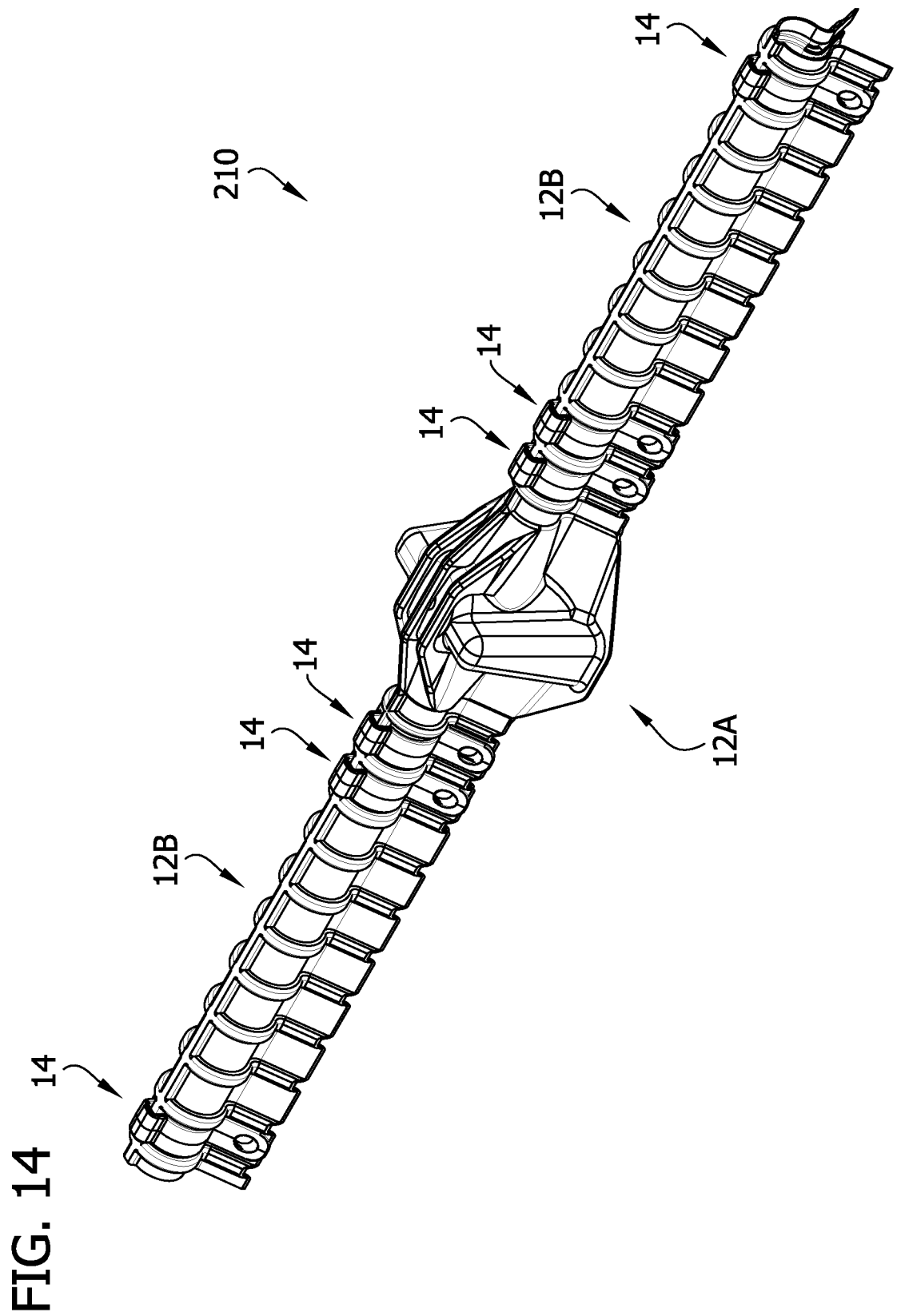
FIG. 14 is an assembled perspective of the electrical distribution line cover of FIG. 13 with sleeves attached to an insulator cover in an extended configuration.

Referring to FIGS. 13 and 14, in one version of the FIG. 12 embodiment, each sleeve mounting portion 211 of the insulator cover 12A includes multiple positions (broadly, at least one position) for the sleeve 12B to attach to (e.g., each sleeve is selectively attachable to the insulator cover at a desired position). This permits a worker to assemble the electrical distribution line cover 210 in the field to a desired length. In this version, each sleeve mounting portion 211 defines two positions (broadly, mounting locations) in which the end portion of the sleeve 12B may be attached to the insulator cover. More or fewer positions are within the scope of the present disclosure. Generally, each position is defined by adjacent tabs 36 on the sleeve mounting portion 211. By selecting which tabs 36 on the sleeve mounting portion 211 the end portion of the sleeve 12B (e.g., the adjacent tabs at the end of the sleeve) overlaps, the worker can select the desired position of the sleeve on the insulator cover and therefore select a desired length of the electrical distribution line cover 210. For example, in one embodiment, when the sleeves 12B are attached to the insulator cover 12A in the first positions (closest to the cup 13) the assembled electrical distribution line cover 210 has a length of 60 inches and when the sleeves are attached to the insulator cover in the second positions (furthest from the cup), as shown in FIG. 14, the assembled electrical distribution line cover has a length of 65 inches. Other dimensions are within the scope of the present disclosure. For example, the electrical distribution line cover may be constructed so that it is adjustable to a desired length of either 75 inches or 80 inches (not shown). In this embodiment, the clip 14 is used to secure the sleeve 12B to the sleeve mounting portion 211. Each position includes an opening 44 that aligns with the opening from the sleeve. The mounting portion 114 of the clip 14 extends through the aligned openings 44 to secure the sleeve 12B and sleeve mounting portion together. In all embodiments described herein, it is not necessary that the clip 14 including a mounting portion 114 or have any portion that extends through either the insulator cover 12A or the sleeve 12B. It is understood that when the sleeve mounting portion 211 includes multiple positions, more than one clip 14 may be used to secure the sleeve 12B to the sleeve mounting portion. For example, when the sleeve 12B is attached to the sleeve mounting portion 211 in the first position, two clips 14—one in the first position and one in the second position—may be used to secure the sleeve to the sleeve mounting portion. Other configurations are within the scope of the present disclosure.

As shown in FIG. 14, when the sleeves 12B are attached to the insulator cover 12A in the second positions, additional clips 14 may be attached to the sleeve mounting positions 211 in the unoccupied first positions. These additional clips 14 in the first positions may be used to secure the insulator cover 12A over the insulator I and to the electrical distribution line L before the sleeves 12B are secured to the electrical distribution line and/or the insulator cover.

The modularity of the electrical distribution line cover 210 allows a worker to assemble the electrical distribution line cover in a desired configuration (e.g., length) in the field. Moreover, forming the electrical distribution line cover 210 from separate components generally makes the manufacturing (e.g., injection molding) of the cover easier. Still further, the sleeves 12B may still be cut to achieve precisely the required length of extension.

Figure 15:
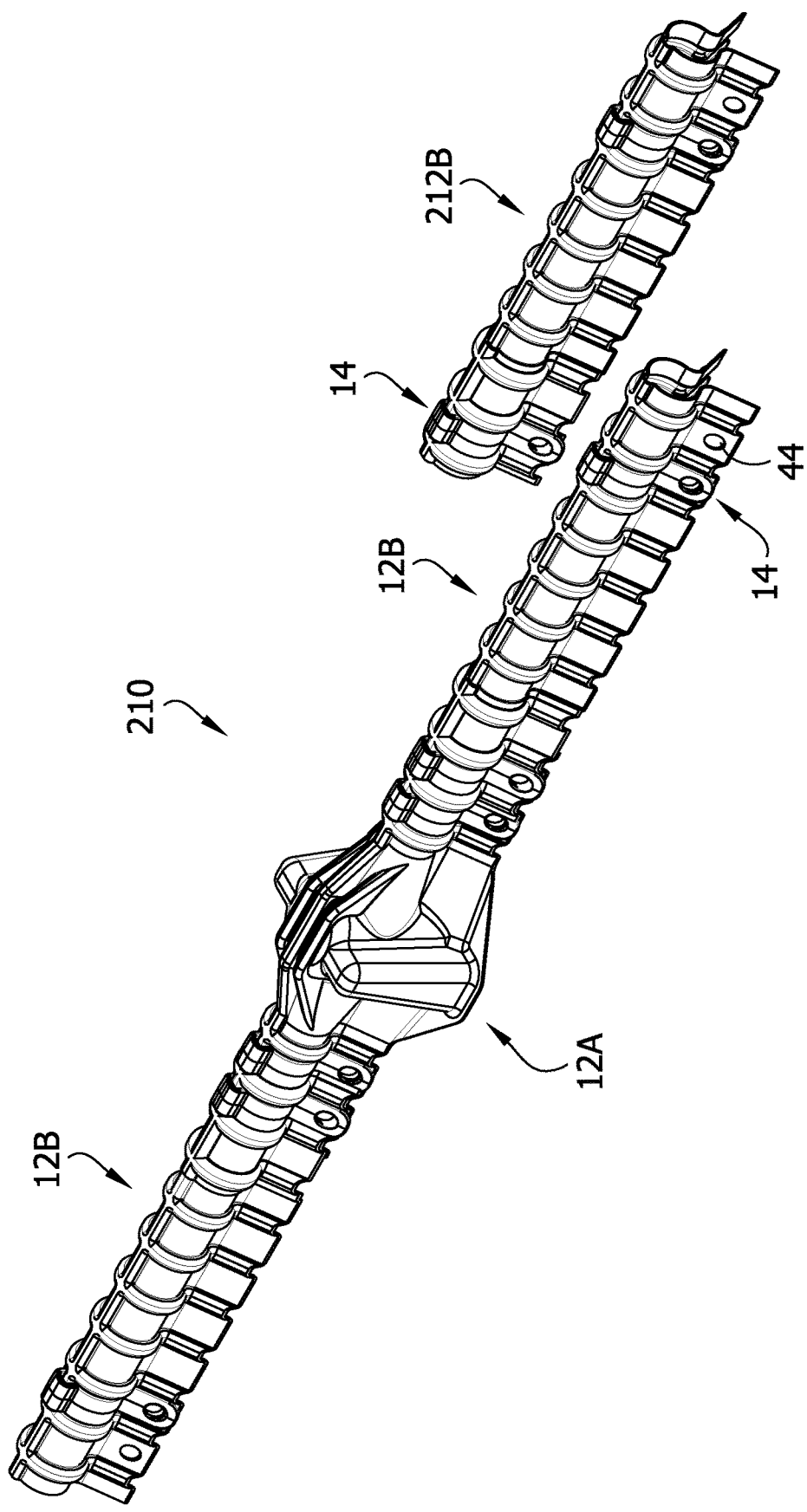
FIG. 15 is a partially exploded perspective of yet another version of an electrical distribution line cover of FIG. 12.
Figure 16:
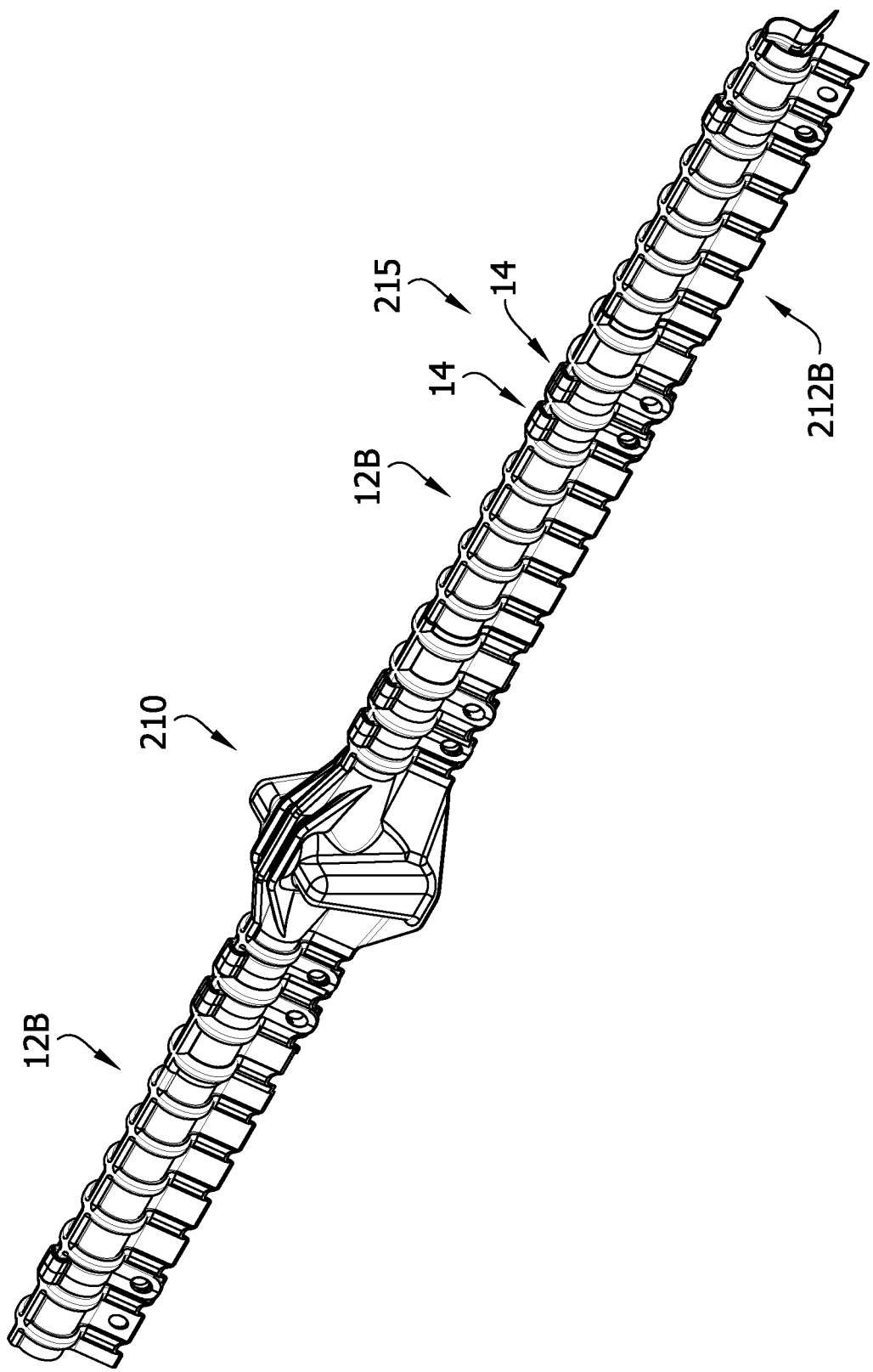
FIG. 16 is an assembled perspective of the electrical distribution line cover of FIG. 15.

Referring to FIGS. 15 and 16, in one embodiment, the electrical distribution line cover 210 may include one or more additional sleeves 212B, which are generally identical to sleeves 12B. It is understood the additional sleeves 212B may be used with electrical distribution line cover 10 as well. The additional sleeves 212B can be attached to the end (e.g., free end) of one of the sleeves 12B or attached to the end of another additional sleeve to extend the overall length of the electrical distribution line cover 210 by forming a sleeve assembly 215 to cover a greater length of the electrical distribution line L. Using one or more additional sleeves 212B, a worker can selectively extend the length of the electrical distribution line cover 210 (specifically the sleeve assembly 215) as desired. In one embodiment, the additional sleeve 212B is selectively attachable to the sleeve 12B at generally any position along the sleeve. This allows a worker to extend the length of the sleeve assembly 215 to generally any desired length. Alternatively, as with sleeves 12B, the additional sleeves 212B can also be cut to generally any length, allowing the working to extend the length of the sleeve assembly 215 to generally any desired length. This is more economical then making a single long sleeve and then cutting the long sleeve to the desired length in the field because less or no material is wasted.

As shown in FIGS. 15 and 16, to attach an additional sleeve 212B to one of the sleeves 12B, the end portion the additional sleeve 212B is arranged to overlap the free end of the sleeve 12B such that the additional sleeve overlies the sleeve (or vice versa). This is similar to the overlapping of adjacent covers 10 described above in relation to FIG. 9, and thus a detailed description of the overlapping of the additional sleeve 212B and the sleeve 12B is omitted herein. In this embodiment, a clip 14 is used to secure the additional sleeve 212B to the sleeve 12B. Like sleeve 12B, additional sleeve 212B includes an opening 44 that aligns with the opening in the sleeve. The mounting portion 114 of the clip 14 extends through the aligned openings 44 to secure the additional sleeve 212B and sleeve 12B. In one version, the sleeve 12B and/or additional sleeve 212B may include multiple openings 44 that can be selectively aligned with one another to permit the additional sleeve to be attached to the sleeve at generally any position along the sleeve. The openings 44 can be partially or entirely omitted, as the mating construction of the sleeves 12B and the insulator cover 12A, and the clips are capable of holding the assemblies together without passing through either the insulator cover 12A or the sleeves 12B. It is understood that more than one clip 14 may be used to secure the additional sleeve 212B to the sleeve 12B.

In view of the above, it will be seen that several advantageous results are obtained.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electrical distribution line cover comprising:
a sleeve having opposite first and second end portions and a length extending therebetween, the sleeve defining an elongate cavity extending along the length of the sleeve sized to receive an electrical distribution line when the sleeve is installed on the electrical distribution line, the sleeve defining an elongate passage extending along the length of the sleeve, the passage configured to permit passage of the electrical distribution line into the elongate cavity when the sleeve is installed on the electrical distribution line;
a resilient clip extending around an exterior surface of the sleeve and biasing the passage of the sleeve toward a closed position for inhibiting the passage of the distribution line out of the cavity of the sleeve after the sleeve is installed on the distribution line.

2. The electrical distribution line cover as set forth in claim 1 further comprises a connection attaching the resilient clip to the sleeve.

3. The electrical distribution line cover as set forth in claim 2 wherein the connection comprises a joining portion of the sleeve formed around a mounting portion of the clip.

4. The electrical distribution line cover as set forth in claim 3 wherein the joining portion comprises an opening in the sleeve and the mounting portion of the resilient clip extends through the opening.

5. The electrical distribution line cover as set forth in claim 4 wherein the joining portion of the sleeve is deformable to release the connection attaching the resilient clip to the sleeve.

6. The electrical distribution line cover as set forth in claim 4 wherein the connection is a first connection and wherein the electrical distribution line cover further comprises a second connection comprising a second mounting portion of the resilient clip and a second joining portion of the sleeve comprising a second opening in the sleeve, the second mounting portion extending through the second opening.

7. The electrical distribution line cover as set forth in claim 1 wherein the sleeve and the resilient clip have openings arranged to jointly receive a hook of a hotstick for grasping the distribution line cover to manipulate the distribution line cover for application to the electrical distribution line and removal from the electrical distribution line.

8. The electrical distribution line cover as set forth in claim 1 further comprising an insulator cap configured to placement on an insulator holding the electrical distribution line, the insulator cap including at least two mounting locations, wherein the sleeve is selectively attachable to the insulator cap at one of the two mounting locations to adjust a length of the electrical distribution line cover.

9. The electrical distribution line cover as set forth in claim 1 further comprising an insulator cap configured for placement on an insulator holding the electrical distribution line, the insulator cap comprising a cup defining a space within the cup to receive at least a portion of the insulator therein.

10. The electrical distribution line cover as set forth in claim 1 wherein the sleeve includes an upper portion defining the cavity for receiving the electrical distribution line when the sleeved is applied to the electrical distribution line, a waist portion below the upper portion and legs projecting from the waist portion on opposite sides of the sleeve to positions below and laterally outward from the waist portion, the legs diverging from each other away from the waist portion.

11. The electrical distribution line cover as set forth in claim 10 wherein the waist portion has a smaller width than a width of the upper portion and smaller than a separation of the legs.

12. The electrical distribution line cover as set forth in claim 11 wherein the separation of the legs at the free ends thereof is greater than the width of the upper portion.

13. The electrical distribution line cover as set forth in claim 10 wherein the upper portion, the waist portion and the legs of the sleeve define the exterior surface of the sleeve, the resilient clip including an interior surface engaging the exterior surface of the sleeve defined by the upper portion, the waist portion and the legs of the sleeve.

14. The electrical distribution line cover as set forth in claim 13 wherein the resilient clip includes a collar defining a portion of the interior surface, a throat defining another portion of the interior surface and first and second legs defining other portions of the interior surface, the portion of the interior surface defined by the collar engaging a portion of the exterior surface defined by the upper portion of the sleeve, the portion of the interior surface defined by the throat engaging a portion of the exterior surface defined by the waist portion of the sleeve, and the portions of the interior surface defined by the legs of the resilient clip engaging respective portions of the exterior surface defined by the legs of the sleeve.

15. The electrical distribution line cover as set forth in claim 1 wherein the sleeve is formed with interlocking formations constructed and arranged to mate with interlocking formations of a sleeve of another distribution line cover.

16. The electrical distribution line cover as set forth in claim 15 wherein the interlocking formations comprise raised tabs extending widthwise of the sleeve in spaced apart relation with each other.

17. The electrical distribution line cover as set forth in claim 16 wherein the tabs define channels whereby when the sleeve of the electrical distribution line cover is placed over the sleeve of said another electrical distribution line cover, tabs of the sleeve of said another electrical distribution line cover are received in respective ones of the channels of the electrical distribution line cover.

18. An electrical distribution line cover kit comprising:
an insulator cap configured for placement on an insulator holding an electrical distribution line, the insulator cap comprising a cup defining a space within the cup to receive at least a portion of the insulator therein; and
a sleeve separate from the insulator cap, the sleeve defining an elongate cavity extending along the length of the sleeve sized to receive an electrical distribution line when the electrical distribution line cover is installed on the electrical distribution line, the sleeve defining an elongate passage extending along the length of the sleeve, the passage configured to permit passage of the electrical distribution line into the elongate cavity when the sleeve is installed on the electrical distribution line, the insulator cap and sleeve being constructed for mating reception of one of the insulator cap and sleeve over the other to form an overlap section; and a clip configured to be applied over the insulator cap and sleeve in the overlap section to compress sides of the insulator cap and sleeve together and securingly join the insulator cap and sleeve together.

19. The electrical distribution line cover as set forth in claim 18 wherein the sleeve is formed with interlocking formations and the insulator cap is formed with interlocking formations, the interlocking formations of the sleeve and insulator cap being constructed and arranged to mate with each other in the overlap section when the insulator cap and sleeve are connected together.

20. The electrical distribution line cover as set forth in claim 19 wherein the interlocking formations of the sleeve comprise at least one raised tab extending widthwise of the sleeve and the interlocking formations of the insulator cap comprise at least one tab extending widthwise of the insulator cap.

21. The electrical distribution line cover as set forth in claim 20 wherein the tabs of the insulator cap and sleeve each define channels whereby when the sleeve and insulator cap are mated together the tab of one is received in the channel of the other.

22. The electrical distribution line cover kit as set forth in claim 18 wherein at least one of the sleeve and the insulator cap includes an upper portion, a waist portion and legs defining an exterior surface of said respective sleeve or insulator cap, the clip including an interior surface configured to engage the exterior surface defined by the upper portion, the waist portion and the legs of said sleeve or insulator cap at the overlap section.

23. The electrical distribution line cover kit as set forth in claim 22 wherein the clip includes a collar defining a portion of the interior surface, a throat defining another portion of the interior surface and first and second legs defining other portions of the interior surface, the portion of the interior surface defined by the collar configured to engage a portion of the exterior surface defined by the upper portion, the portion of the interior surface defined by the throat configured to engage a portion of the exterior surface defined by the waist portion, and the portions of the interior surface defined by the legs of the clip configured to engage respective portions of the exterior surface defined by the legs of said sleeve or insulator cap.

24. An electrically insulating cover system for coving electrical components comprising:

a first electrically insulating cover part sized and shaped to at least partially receive and cover a first portion of the electrical component;

a second electrically insulating cover part sized and shaped to at least partially receive and cover a second portion of the electrical component, the first and second insulating cover parts being configured to connect to each other in an overlapping relation to form an overlap section;

a resilient clip sized and shaped to be received over the overlap section to secure the first electrically insulating cover part to the second electrically insulating cover part, the resilient clip including opposing first and second legs each having an inwardly facing interior surface, the interior surfaces of the first and second legs configured to engage an exterior surface of the overlap section when the resilient clip is received over the overlap section.

25. The electrically insulating cover system as set forth in claim 24 wherein the resilient clip is configured to reside entirely on the exterior of the first and second electrically insulating cover parts when received on the overlap section of the connected first and second electrically insulating cover parts.

26. The electrical distribution line cover system as set forth in claim 24 wherein one of the first and second electrically insulating cover parts includes an upper portion, a waist portion and legs defining the exterior surface of the overlap section, the resilient clip being configured to engage the exterior surface of the overlap section defined by the upper portion, the waist portion and the legs of said first or second electrically insulating cover part.

27. The electrical distribution line cover system as set forth in claim 26 wherein the resilient clip includes a collar defining an interior surface and a throat defining another interior surface, the interior surface defined by the collar configured to engage a portion of the exterior surface defined by the upper portion, the interior surface defined by the throat configured to engage a portion of the exterior surface defined by the waist portion, and the interior surface defined by the first and second legs of the resilient clip configured to engage respective portions of the exterior surface defined by the legs of said first or second electrically insulating cover part.

* * * * *